No. 612,640. Patented Oct. 18, 1898.
W. COCHRAN.
MACHINE FOR PUNCHING CARDS.
(Application filed Feb. 12, 1897.)
(No Model.)
5 Sheets—Sheet 2.

No. 612,640. Patented Oct. 18, 1898.
W. COCHRAN.
MACHINE FOR PUNCHING CARDS.
(Application filed Feb. 12, 1897.)
(No Model.) 5 Sheets—Sheet 3.
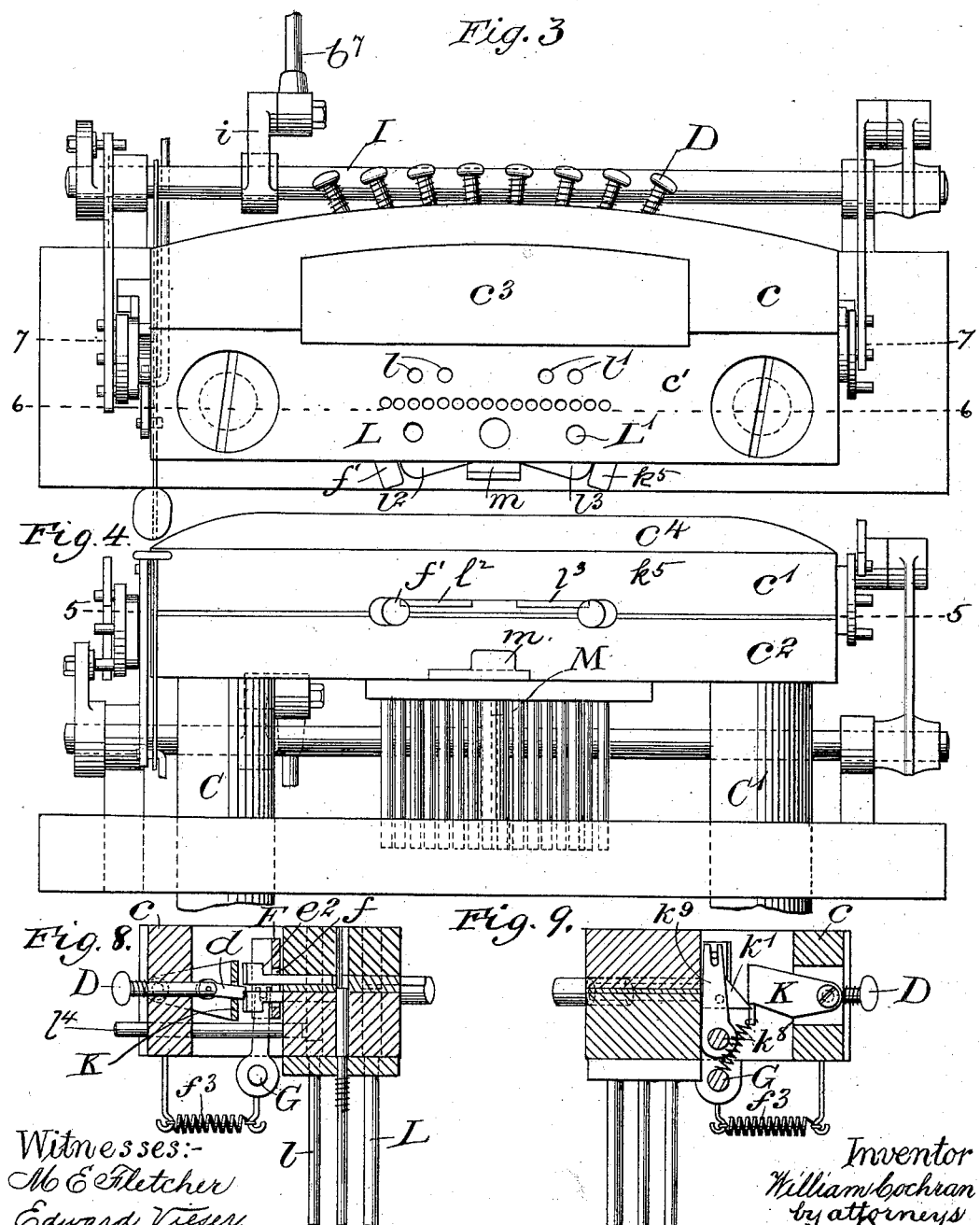

No. 612,640. Patented Oct. 18, 1898.
W. COCHRAN.
MACHINE FOR PUNCHING CARDS.
(Application filed Feb. 12, 1897.)
(No Model.) 5 Sheets—Sheet 4.

Witnesses:
M. E. Fletcher
Edward Vielé

Inventor
William Cochran
by attorneys
Brown & Seward

No. 612,640. Patented Oct. 18, 1898.
W. COCHRAN.
MACHINE FOR PUNCHING CARDS.
(Application filed Feb. 12, 1897.)
(No Model.) 5 Sheets—Sheet 5.
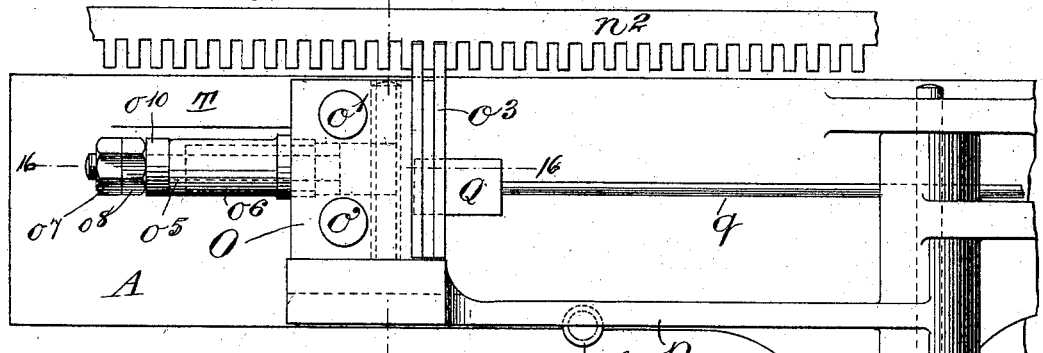
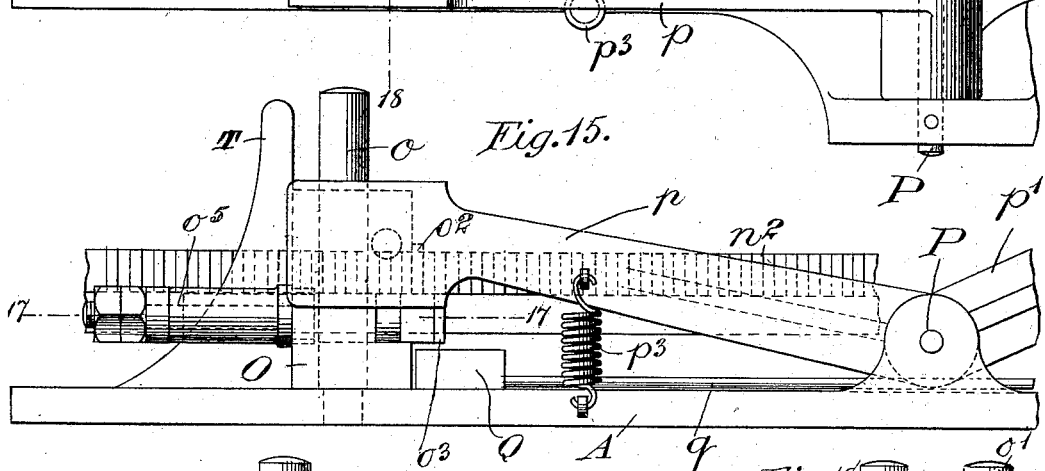
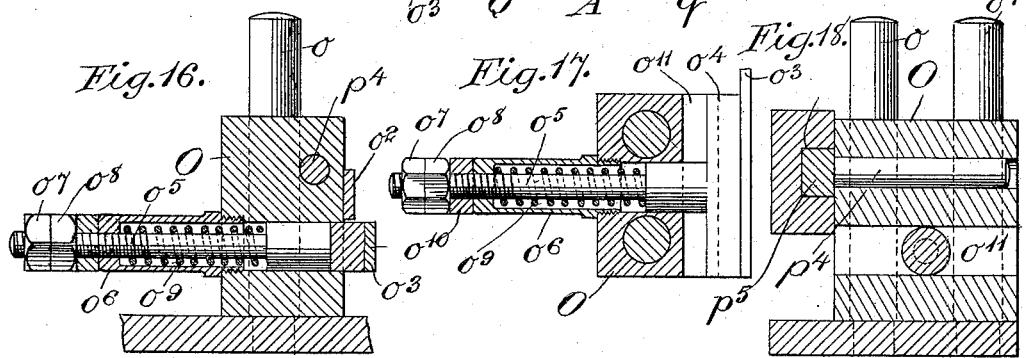
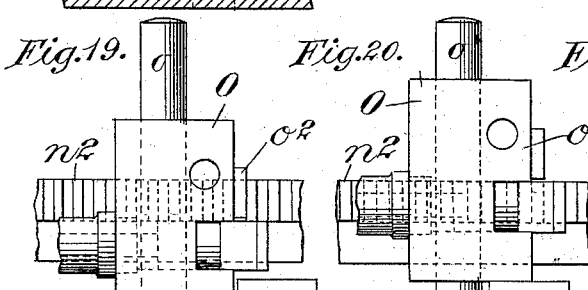
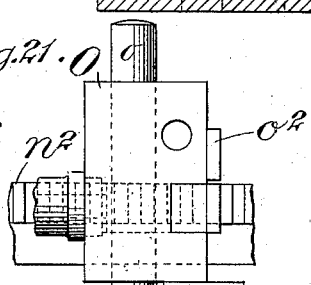
Witnesses
M. E. Fletcher
Edward Vieser
Inventor
William Cochran
by attorneys
Brown & Seward

UNITED STATES PATENT OFFICE.

WILLIAM COCHRAN, OF PATERSON, NEW JERSEY, ASSIGNOR TO JOHN ROYLE & SONS, OF SAME PLACE.

MACHINE FOR PUNCHING CARDS.

SPECIFICATION forming part of Letters Patent No. 612,640, dated October 18, 1898.

Application filed February 12, 1897. Serial No. 623,189. (No model.)

*To all whom it may concern:*

Be it known that I, WILLIAM COCHRAN, of Paterson, in the county of Passaic and State of New Jersey, have invented a new and useful Improvement in Piano-Machines for Punching Jacquard-Cards, of which the following is a specification.

My invention relates to an improvement in piano-machines for punching jacquard-cards in which provision is made for placing a plurality of punches under the control of a single key.

My invention further contemplates improvements in the feed mechanism and in the mechanisms for controlling the locking and releasing of the punches, whereby the said mechanisms may be actuated by the punch-operating mechanism or by hand at the will of the operator.

My invention further contemplates features of construction which will be hereinafter particularly described.

A practical embodiment of my invention is represented in the accompanying drawings, in which—

Figure 1:
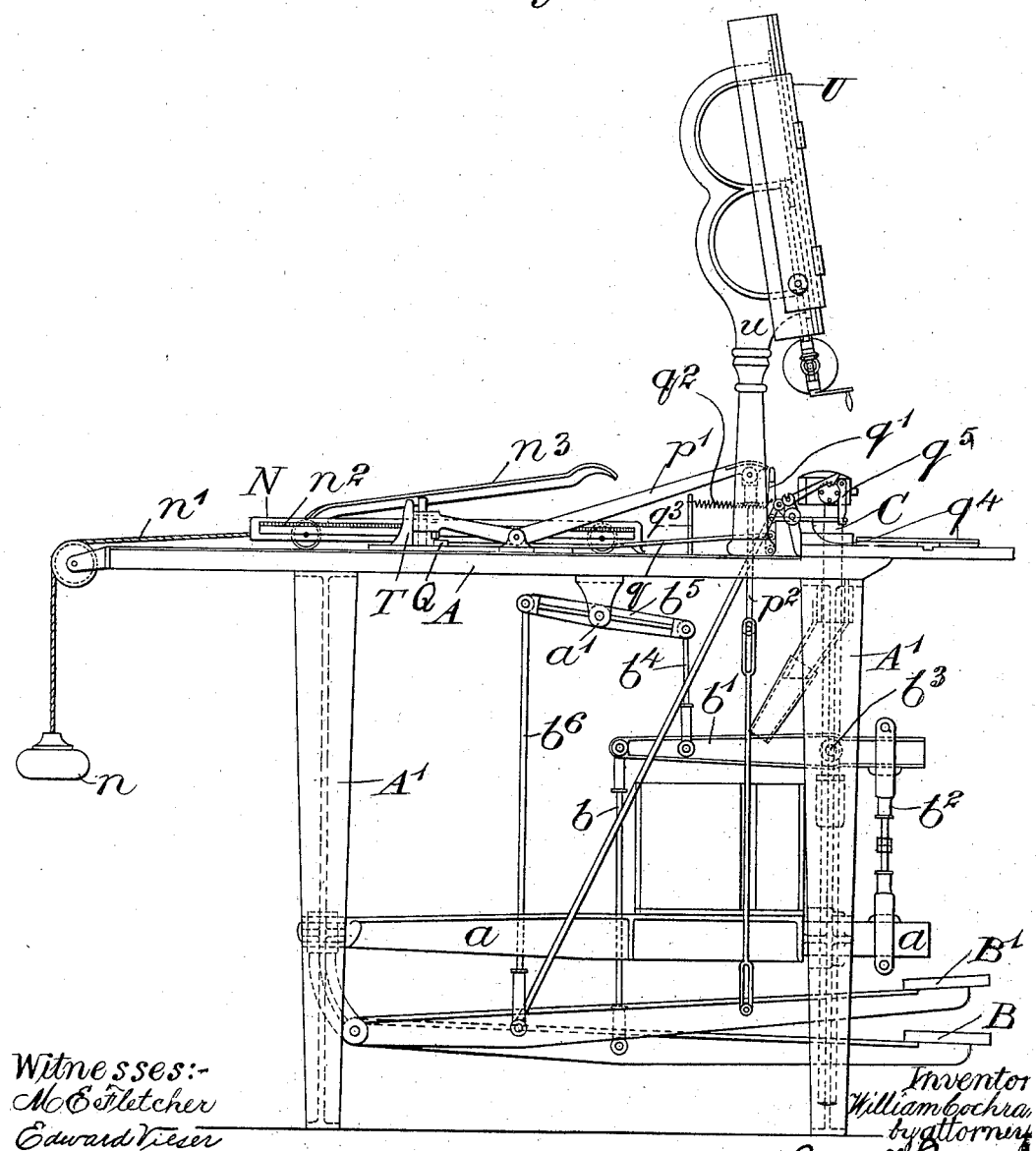
Figure 2:
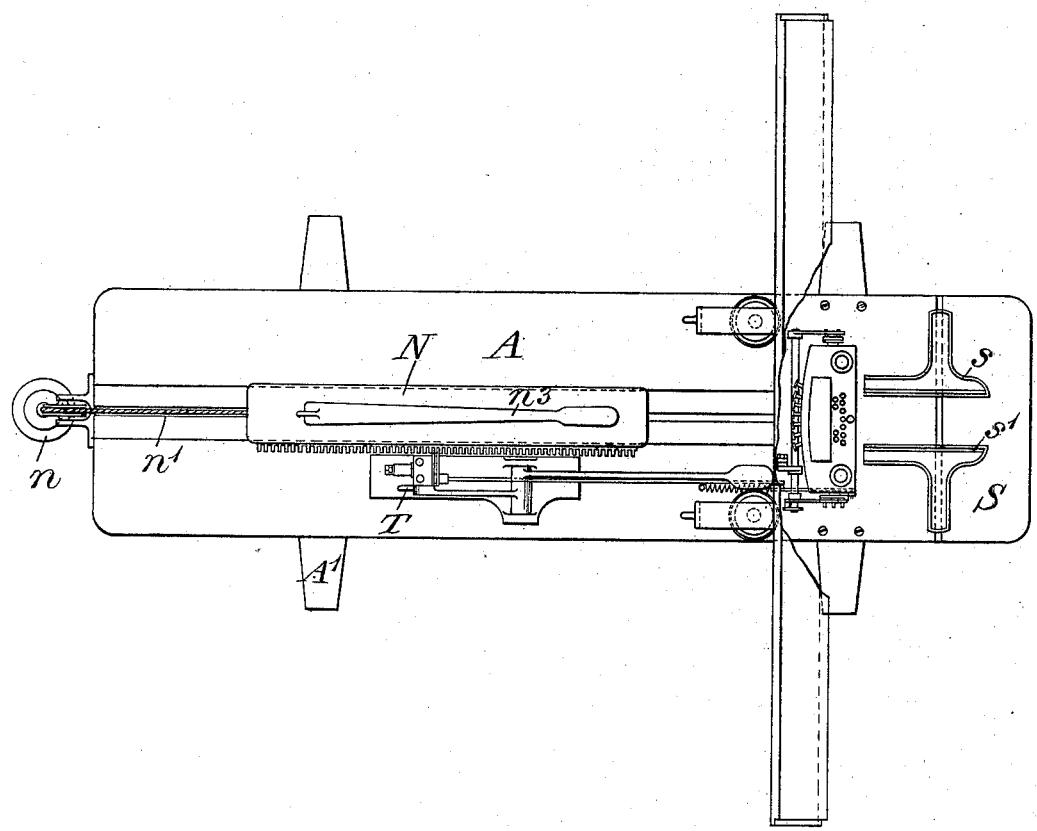
Figure 10:
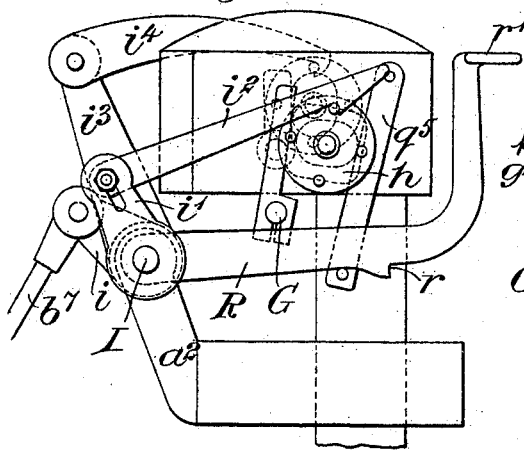
Figures 11, 12, 13:
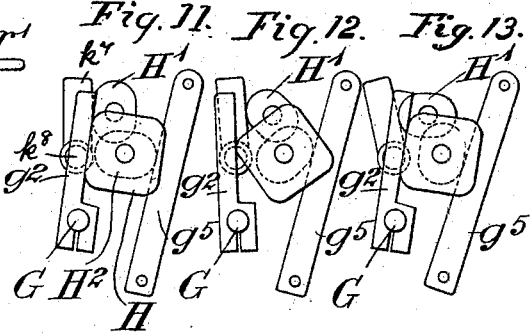
Figure 5:
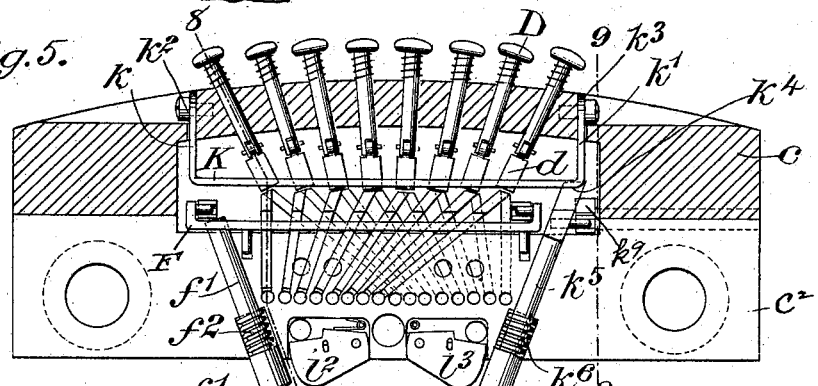
Figure 6:
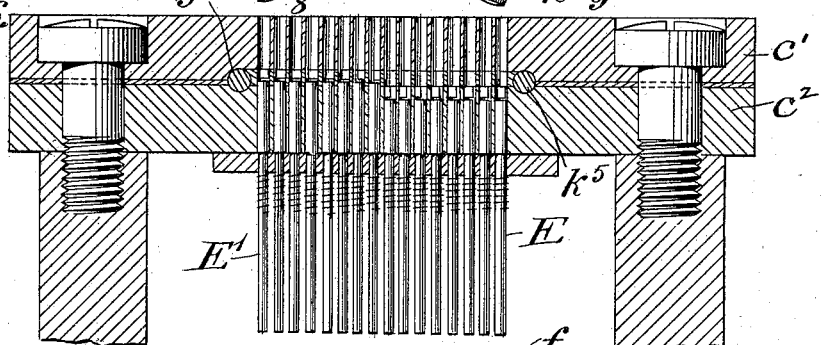
Figure 7:
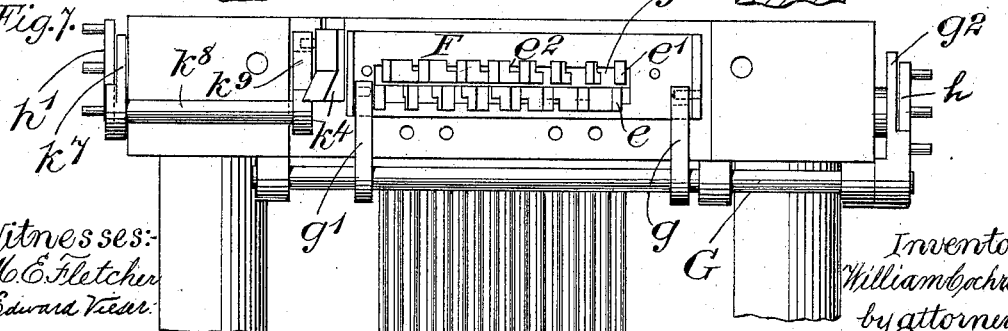

Figure 1 is a view of the machine in side elevation, certain of the smaller parts being omitted. Fig. 2 is a top plan view of the same, the reading-board having a portion of its support cut away and the cap-piece of the punch and key supporting head being removed. Fig. 3 is an enlarged top plan view in detail of the punch and key supporting head and parts adjacent thereto. Fig. 4 is a view of the same in front elevation. Fig. 5 is a horizontal section through the punch and key supporting head in the plane of the line 5 5 of Fig. 4. Fig. 6 is a vertical section through the head along the line 6 6 of Fig. 3. Fig. 7 is a vertical section through the head along the line 7 7 of Fig. 3. Fig. 8 is a vertical transverse section through the head in the plane of the line 8 8 of Fig. 5, looking toward the right. Fig. 9 is a vertical transverse section through the head in the plane of the line 9 9 of Fig. 5, looking toward the left. Fig. 10 is an enlarged view in end elevation showing the operating mechanism at the end of the key and punch supporting head. Figs. 11, 12, and 13 represent three different positions of the operating-cams at the ends of the head and the parts adjacent thereto. Fig. 14 is an enlarged partial top plan view of the feed mechanism. Fig. 15 is a view of the same in side elevation. Fig. 16 is a vertical longitudinal section in the plane of the line 16 16 of Fig. 14. Fig. 17 is a horizontal section in the plane of the line 17 17 of Fig. 15. Fig. 18 is a vertical transverse section in the plane of the line 18 18 of Fig. 14, and Figs. 19, 20, and 21 represent in side elevation three different positions of the feed-escapement.

The framework of the machine in the form in which I have embodied my present invention consists of a bed-plate A, supported upon legs A'. It is that type of machine in which the punches are operated by means of treadles within convenient reach of the operator as distinguished from a power-machine, although the various improvements, to which attention will be hereinafter more particularly called, are equally well adapted to use in a machine of the power type.

The treadles, one for depressing the bank of punches and the other for elevating or returning the bank of punches, are denoted, respectively, by B B'. The former B is connected by a rod $b$ with the end of a lever $b'$, supported upon a vertically-adjustable fulcrum $b^2$, attached to a fixed portion $a$ of the frame. The lever $b'$ is connected intermediate of its fulcrum and its free end, as at $b^3$, with the guide-rods C C', which support the punch and key carrying head, so that when the lever B is depressed, as shown in Fig. 1, the bank of punches will be brought down into engagement with the card to be punched. The lever $b'$ is also connected by a rod $b^4$ with one arm of a vibrating lever $b^5$, pivoted to a hanger $a'$, the opposite arm of said lever $b^5$ being connected by a rod $b^6$ with the treadle B', so that when the treadle B is depressed, as shown in Fig. 1, to bring the punches into engagement with the card it will at the same time elevate the treadle B' into the position shown in Fig. 1, and when the treadle B' is depressed it will in turn, through the connecting-rods $b^6$ $b^4$ and the vibrating lever $b^5$, lift the free end of the lever $b'$, and thereby raise the punches from the card and at the same time raise the treadle B ready for a repetition of the punching operation.

The reciprocating movement of the treadle B' is made to operate the feed and control the effect of the punch-locking keys by certain connections, which will be hereinafter more particularly referred to after the structure and arrangement of the parts to be operated thereby have been particularly considered.

One of the prominent features of my present invention is the structure and arrangement of the punch-locking keys and the parts which coöperate therewith, by which one or more of the keys—in the present instance, each key—is made to control the locking of a plurality of punches. The punch and key carrying head for the purpose of assembling the several parts, gaining ready access thereto, and keeping them in order is made of three longitudinal sections $c$ $c'$ $c^2$, the rear section $c$ being of a depth or thickness substantially equal to the combined thicknesses of the two front sections $c'$ $c^2$, the front of the rear section $c$ and the rear portions of the front sections $c'$ $c^2$ being cut away to form a central opening $c^3$, extending vertically through the head, (see Fig. 3,) in which opening the parts for directing the tips of the keys and for returning the locking-bars to their normal position are made to operate. The several sections of the head are firmly secured together and are finally surmounted by a cap-piece $c^4$, which serves as a hand-rest for the operator when manipulating the keys.

In the present form of my invention I have shown a bank of eight keys, each of which is represented by D, for locking the punches which are to punch the pattern-holes in the cards. The punches for punching the pattern-holes in the cards are twice as many in number as the number of keys D, one group of eight of said punches being denoted by E and the other group of eight being denoted by E'. The keys D are spring-actuated and are made to reciprocate horizontally through the rear section $c$ of the head, and each is provided with a movable tip $d$, pivoted to the shank of the key D, so as to be swung into a higher or lower plane, as may be desired. The locking-bars for locking the bank of punches are arranged in two banks in different vertical planes, the one bank (denoted by $e'$) being under the control of the keys D when their tips $d$ are raised and the other bank, $e$, being under the control of the keys when the tips $d$ are lowered. The several locking-bars $e$ $e'$ are each provided with a shoulder $e^2$, by means of which they are engaged by a retracting-plate F through a slot $f$, in which the banks of locking-bars project into the opening $c^3$ in the head. The retracting-plate F is made to reciprocate away from and toward the front wall of the opening $c^3$ by means of arms $g$ $g'$ on a rock-shaft G, mounted in suitable bearings beneath the punch and key supporting head and subject to a rocking movement by means of a cam H on the hub of a lantern-pinion $h$, which cam engages an operating-arm $g^2$, fixed on the rock-shaft G.

At each depression of the pedal B' the lantern-pinion $h$ is actuated through the action of a connecting-rod $b^7$, leading from the pedal B' to an arm $i$ on a rock-shaft I, journaled in suitable supporting-brackets $a^2$ on the bed-plate A, and provided with an arm $i'$, carrying a hook-pawl $i^2$, which extends from the arm $i'$ into engagement with the pins on the lantern-pinion $h$.

As shown in the accompanying drawings, the bank of locking-bars $e$ is arranged to lock the group of punches E, and the bank of locking-bars $e'$ is arranged to lock the group of punches E', while both banks of locking-bars $e$ and $e'$, or one or more individual members of the banks which may have been advanced by the keys, are returned from their locking positions by the rearward movement of the plate F at each depression of the treadle B'. The cam H for operating the shaft G, and hence the retracting-plate F, is provided with four operating projections at equal distances apart and is turned a quarter-revolution by the pawl $i^2$ at each depression of the treadle B' to rock the shaft in a direction to throw the retracting-plate F rearwardly and then permit the shaft G to rock back into position, and with it the retracting-plate F, to leave the locking-bars free to be operated by the keys. The motion of the cam H and its effect upon the arm $g^2$, and hence upon the shaft G, during a quarter-revolution of the cam or during a single operating movement of the pawl $i^2$ is shown in Figs. 11, 12, and 13, the position shown in Fig. 11 being that of the parts at the beginning of the stroke, the position shown in Fig. 12 being that of middle stroke or when the retracting-plate is at the limit of its rearward movement, and the position shown in Fig. 13 being that at the completion of the stroke or when the retracting-plate is at the limit of its forward movement.

In connection with the swinging tips $d$ at the ends of the keys D there is provided a vertically-movable tip-adjusting plate K, through which the tips $d$ extend, the said plate K being pivoted, by means of arms $k$ and $k'$ at its ends, to the rear section of the head, as shown at $k^2$ $k^3$. When the plate K is in its lowermost position, as shown in Fig. 8, the tips are in position to engage the bank of locking-bars $e$, and provision is made for lifting the said plate K, and with it the tips $d$, to bring them into position to engage the bank of locking-bars $e'$. This is accomplished by means of the bevel-faced nose $k^4$ (see Figs. 5 and 7) on the end of a sliding pin $k^5$, which pin is provided with a retracting-spring $k^6$ and has its head projecting from the front of the punch and key carrying head in position to be operated by the thumb of the operator when so desired. The pin $k^5$, and with it the adjustable plate K, is operated automatically from the treadle B' by means of the rock-shaft I, hereinbefore referred to, which carries at its end opposite that where the hook-pawl $i^2$ is attached an arm $i^3$, having pivoted thereto a hook-pawl $i^4$, which engages pins on a lantern-pinion $h'$, provided on its hub with a cam H', which cam operates an arm $k^7$ on a short rock-shaft $k^8$, which also has fixed to rock therewith an arm $k^9$, having a pin-and-slot engagement with the aforesaid sliding pin $k^5$. The cam H' is provided with extensions for operating the sliding pin $k^5$, located diametrically opposite each other, and serves to advance the sliding pin $k^5$ twice during a revolution of the lantern-pinion $h'$ or one-half as often as the retracting-plate F is operated by the shaft G.

The respective positions of the two cams H and H' are indicated during a quarter-revolution of their respective lantern-pinions by the rocking shaft I, when the treadle B' is depressed, in Figs. 11, 12, and 13, hereinbefore referred to. It will there be observed that the effect of the cam H upon the retracting-plate to move it to the limit of its rearward movement and back again into normal position takes place during each vertical adjustment of the tips $d$ by the adjusting-plate K, controlled by the cam H', so that such of the locking-bars as may have been operated in the lower bank will be returned to their normal positions before the locking-bars of the upper bank are thrown into locking position, and vice versa, thereby leaving only such punches locked as are intended to make additional holes at each operation of the bank of keys.

For the purpose of operating the retracting-plate F by the thumb instead of by the treadle whenever the operator so desires I provide a push-pin $f'$, the head of which projects from the front of the key-supporting head, the said pin being provided with a retracting-spring $f^2$.

In addition to the punches for punching the pattern-holes in the card I provide two sets of lace-hole punches and a peg-hole punch. In one set of lace-hole punches I provide for a single lace-hole at each of two or three positions along each edge of the card, as is common, while in the other set of lace-hole punches I provide for groups of two lace-holes at each of two or more positions along the edge of the card. The locations of these two groups of lace-hole punches are denoted by the positions of the punch-receiving sockets in Figs. 3 and 5, the set of single-lace-hole punches being denoted by L L' and the set of double-lace-hole punches by $l\ l'$. The punches L L' are controlled by spring-actuated thumb-plates $l^2\ l^3$, which may be pressed across the punch-sockets to lock the punches L L' in operating position when so desired, and the punches $l\ l'$ are controlled by special spring-actuated pins $l^4$, located below the keys D and extending horizontally into position to lock the punches in operative position when desired. The punches $l\ l'$ are preferably smaller than the punches L L', and they may be used either in groups of two or singly, as may be desired.

The peg-hole punch is denoted by M and is locked in operative position by means of a spring-actuated plate $m$, which projects from the front of the punch-carrying head and may be pushed rearwardly to lock the peg-hole punch in operative adjustment.

As the pattern-hole punches are arranged in a single line and operated by a single set of keys in group s it is important that the feed of the card should take place only after each second operation of the punches whenever the entire bank of punches is being utilized for the pattern. To provide for this, I have arranged a feed mechanism which will automatically skip each alternate step, if so desired, or it may be made to feed at every step whenever such a feed is required.

On the bed-plate A there is mounted a feed-carriage N for feeding the card to be punched step by step beneath the bank of punches. The carriage is constantly drawn toward the rear by means of a weight $n$, attached to the rear end of the carriage by a cord $n'$. The movement of the carriage under the influence of the weight $n$ is controlled by a rack-bar $n^2$, fixed to the side of the carriage N, the teeth of which are engaged by a stationary and a movable tooth on a reciprocating escapement-head, as follows:

The reciprocating escapement-head is denoted by O (see particularly Figs. 14 to 21, inclusive) and is guided in its vertically-reciprocating movements by means of guide-pins $o\ o'$, fixed in the bed-plate A. The fixed tooth $o^2$ is attached at the front of the head and projects past the end of the head, as clearly shown in Fig. 14, in position to engage the teeth on the rack-bar $n^2$. The movable tooth $o^3$ is fixed to the front of a sliding plate $o^4$, which has a rearwardly-extending stem $o^5$, which passes through an opening in the head O and through a housing $o^6$, fixed to the rear of the head, and is provided at its rear end with an adjusting-nut $o^7$ and a locking-nut $o^8$ for the purpose of adjusting accurately the tooth $o^3$ relatively to the tooth $o^2$. The tooth $o^3$ is held normally advanced from the tooth $o^2$ a distance equal to that between two successive teeth on the rack-bar $n^2$ by means of a spring $o^9$, interposed between a shoulder on the stem $o^5$ and the rear end of the housing $o^6$. A washer $o^{10}$ of some suitable yielding material—such, for example, as vulcanized rubber—may be inserted between the lock-nut $o^8$ and the rear end of the housing $o^6$ to relieve the shock upon the tooth $o^3$ when it is returned to its normal position under the influence of the spring $o^9$. The plate $o^4$, to which the movable tooth $o^3$ is fixed, is permitted a rearwardly and forwardly sliding movement within a slot $o^{11}$, formed in the front of the escapement-head O.

The escapement-head O is reciprocated on the guides $o$ $o'$ by means of an arm $p$ of an operating-lever, pivoted at P to the bed-plate A and having its forwardly-extending arm $p'$ connected by a longitudinally-adjustable rod $p^2$ with the treadle B'.

The fixed tooth $o^2$ is located in a plane above the plane of the tooth $o^3$, so that when the head O is depressed to bring the fixed tooth $o^2$ into full engagement with the rack-bar $n^2$ the movable tooth $o^3$ will occupy a position below the rack-bar and out of engagement with its teeth. The arm $p$ of the escapement-operating lever is drawn normally downward by means of a retracting-spring $p^3$, connecting it with the bed-plate. The connection of the arm $p$ of the lever with the escapement-head is formed by means of a pin the body portion $p^4$ of which (see Fig. 18) is seated in a socket in the head O and the head $p^5$ of which is held in an elongated open slot $p^6$ in the rear end of the arm $p$. This admits of the vertically-reciprocating movement of the escapement-head by the swinging movement of the rear arm $p$ of the operating-lever without any tendency to bind.

As thus far described, the carriage N, and hence the card which may be attached thereto, would be fed rearwardly one step at each operation of the punch-head down and return—that is, with each depression of the treadle B'. This feed would take place as follows: When the treadle B' is elevated, as shown in Fig. 1, and the punches depressed into position to engage the card, the carriage N will be held stationary by the fixed tooth $o^2$ of the escapement in engagement with the rack-bar $n^2$, as shown clearly in Fig. 15. When the treadle B' is depressed to return the treadle B to its normal position to lift the punches out of engagement with the card, the escapement-operating lever will be rocked by a downward pull upon its forward arm $p$ and a consequent lifting of its rear arm $p'$, which action will lift the stationary tooth $o^2$ of the escapement out of engagement with the rack-bar $n^2$ and at the same time engage the movable tooth $o^3$ with the rack-bar. The moment the stationary tooth $o^2$ is lifted out of engagement with the rack-bar the strain upon the carriage by the weight $n$ will draw the carriage and the movable tooth $o^3$ therewith rearwardly against the tension of the spring $o^9$ on the stem of the movable tooth until the plate $o^4$ of the movable tooth engages the rear wall of the slot $o^{11}$ in the escapement-head—that is, a distance equal to the distance between two successive teeth upon the rack-bar $n^2$. As the treadle B is again depressed to operate the punches it will by elevating the treadle B' permit the arm $p'$ of the escapement-operating lever to lift under the downward pull of the spring $p^3$ and the fixed tooth $o^2$ of the escapement will be lowered into engagement with the rack-bar $n^2$, occupying the same position from which the movable tooth $o^3$ is withdrawn by the downward movement of the escapement-head. As soon as the escapement-head has reached a downward movement sufficient to free the movable tooth $o^3$ from the rack-bar $n^2$ the said tooth $o^3$ will spring forwardly under the impulse of its actuating-spring $o^9$ in position to enter into engagement with a succeeding tooth on the rack-bar $n^2$, when the escapement-head O shall be again elevated by the return movement of the punches and the consequent downward movement of the treadle B'.

For the purpose of preventing the feed of the carriage, and hence of the card that may be attached thereto, at each successive operation of the punches to enable the punch-head to be depressed several times—in the present instance twice—intermediate of successive steps of feed, I provide a sliding block Q in position to be slid beneath the escapement-head when the latter is elevated to prevent it from moving downwardly a distance sufficient to free the movable tooth $o^3$ from the rack-bar $n^2$. The sliding block Q is connected by a rod $q$ with a lever $q'$, fulcrumed at and uprising from the bed-plate A a short distance to the rear of the punch-carrying head, which lever $q'$ is normally drawn rearwardly into position to insert the sliding block Q beneath the escapement-head by means of a spring $q^2$, fastened at one end to the lever $q'$ and at its opposite end to a pin $q^3$, uprising from the bed-plate. The lever $q'$ has a removable connection with a hanging arm $q^5$, carried by the punch-head in position to engage a cam H$^2$, fixed to rotate with the cam H and of the same general form as the cam H', to which attention has heretofore been called. The cam H$^2$ is, however, set at an angle of ninety degrees to the cam H', so that the effect of the cam H$^2$ in rocking the arm $q^5$ forwardly and hence, through the lever $q'$ and connecting-rod $q$, drawing the block Q forwardly, where it will not interfere with the depression of the escapement-head, will take place at such time as the cam H' is in position to permit the keys D to operate the bank of locking-bars which control the group of punches E; but when the cam H' is in position to permit the keys D to operate the bank of locking-bars which control the group of punches E'—that is, in the position shown in Fig. 13—the cam H$^2$ will be in position to permit the arm $q^5$ to swing rearwardly, and thereby permit the block Q to rest beneath the escapement-head and so prevent the feed of the carriage during the operation of that group of punches.

In Figs. 19, 20, and 21 I have shown the positions which the fixed and movable teeth assume with relation to the rack-bar at the beginning of the upward movement of the escapement-head from its lowermost position at the limit of the upward movement of the head and before the carriage, together with the movable tooth, has moved rearwardly and after the carriage, together with the movable tooth, has moved rearwardly, respectively, the position shown in Fig. 21 being that which the parts assume when the block Q is in position to prevent the depression of the escapement-head, and hence the feed-step, while the group of punches E' is being manipulated. The operator by pulling forward upon the lever $q'$ may at his pleasure withdraw the block Q from its position to arrest the feed, and whenever so desired the said lever $q'$ may be locked in its forward position, with the block Q removed from beneath the escapement-head, by hooking the forward end of the connecting-rod $q^4$ over a shoulder $r$ on a swinging retaining-bar R, pivoted on the shaft I and provided with a handle $r'$ within convenient reach of the operator. The carriage N is provided with a handle $n^3$ for convenience in drawing it forward for engaging a new card to be punched, and when such movement of the carriage takes place the arm $p'$ of the escapement-operating lever may be depressed sufficiently to throw both of the teeth $o^2$ $o^3$ out of engagement with the rack-bar $n^2$. The connecting-rod $p^2$, which connects the arm $p'$ with the treadle B', has lost motion in its connection with the treadle B' conveniently by means of a slot-and-pin connection with the treadle which will permit the arm $p'$ of the lever to be depressed without affecting the treadle, while the depression of the treadle B' will at the same time serve to depress the arm $p'$.

The operation of the several parts has been so fully set forth in connection with the description of the parts themselves that a general description will be sufficient to an understanding of the operation of the machine as a whole.

The general operation is as follows: A card to be punched having been placed in position on the table S at the front of the machine by means of the guides $s$ $s'$ and the carriage N having been attached to the card for moving it step by step to the rear, the operator manipulates the machine as follows: Suppose the cams H, H', and H² to be in the positions represented in Fig. 11, the group of punches E under the control of the keys D, the block Q drawn away from beneath the escapement-head, the punch-head depressed by the treadle B, the treadle B' up and the escapement-head down, with its fixed tooth engaged with the rack-bar. The return movement of the treadle B and downward movement of the treadle B' will raise the escapement-head and permit the carriage to move one step. The same movement of the treadle B' will rotate the cams H H' H² into the position shown in Fig. 13, lifting the key-tips into position to engage the locking-bars for controlling the group of punches E' and permitting the block Q to move rearward beneath the escapement-head. The quarter-revolution of the cam H has also operated the retracting-plate F to return the locking-bars to their normal positions, and the retracting-spring $f^3$ has returned the retracting-plate F to its normal position. The keys may be manipulated to lock one or more of the group of punches E', and the punch-head depressed by the treadle B to bring the punches into engagement with the card. As the treadle B' rises the escapement-head will be prevented from lowering by the block Q, and the movable tooth $o^3$ will not be thrown out of engagement with the rack-bar to engage a successive tooth. The return movement of the treadle B and the corresponding downward movement of the treadle B' will not, therefore, permit the carriage to move a step to the rear, but will rotate the cams H, H', and H² into the positions shown in Fig. 11, with the keys D in position to manipulate the group of punches E and the block Q withdrawn from beneath the escapement-head, the cam H having, as before, served, by its quarter-revolution, to return the locking-bars into normal position. The punch-head may then be depressed by the treadle B to bring the group of punches E into engagement with the card in alinement with the holes punched by the group E', and during the return movement of the treadle B and the corresponding downward movement of the treadle B' the feed will again take place, since the last upward movement of the treadle B' as the treadle B was depressed permitted the escapement-head to lower into position to allow the tooth $o^3$ to advance and engage the next succeeding tooth of the rack-bar as the treadle B' was lowered.

An abutment T is located in position to form a bearing for the rear face of the escapement-head as it reciprocates upon its guides $o$ $o'$ and serves to prevent the displacement of the escapement-head and the teeth $o^2$ $o^3$, carried thereby, by relieving the guides $o$ $o'$ from the concussion due to the abrupt stopping of the carriage at the end of each step of its feed movement.

The reading-board for holding the pattern in position before the operator is denoted by U and is supported upon a bracket $u$, uprising from the table A. As it forms no part of my present invention, a specific description thereof is omitted.

It is obvious that changes might be resorted to in the form and arrangement of the several parts without departing from the spirit and scope of my invention. Hence I do not wish to limit myself strictly to the structure herein shown and described; but

What I claim is—

1. The combination with a plurality of punches and locking-bars one for each punch, of a key provided with a movable tip and means for adjusting the tip into position to operate different locking-bars, substantially as set forth.

2. The combination with a group of keys provided with movable tips, a plurality of groups of locking-bars arranged in different planes and punches in position to be locked by the locking-bars, of a reciprocating plate arranged to simultaneously move the key-tips from their position to operate one group of locking-bars to a position to operate another group of locking-bars, substantially as set forth.

3. The combination with a plurality of groups of locking-bars and punches in position to be locked by the bars, of a group of keys arranged to operate the different groups of locking-bars, a punch-operating mechanism, a connection between the punch-operating mechanism and the keys for directing the keys to different groups of locking-bars and a device under the control of the hand of the operator for directing the said keys to different groups of locking-bars, substantially as set forth.

4. The combination with groups of locking-bars arranged in different planes and punches in position to be locked by the bars, of keys for operating the locking-bars and a reciprocating retracting-plate common to the different groups of locking-bars for returning the bars to their normal position, substantially as set forth.

5. The combination with the locking-bars, punches in position to be locked by the bars, keys for operating the bars and a punch-operating mechanism, of a retracting-plate under the control of the punch-operating mechanism to return the bars to their normal position and a device under the control of the hand of the operator for operating the retracting-plate to return the bars to their normal position, substantially as set forth.

6. The combination with the feed-carriage, the escapement for controlling its movements, the punches and a punch-operating mechanism, of a device for preventing the action of the escapement at each alternate stroke of the punches and means for holding said preventing device out of action at will, substantially as set forth.

7. The combination with the punch-carrying head and the treadle for operating it, of the punches, the locking-bars, the keys for operating the locking-bars, the retracting-plate for returning the locking-bars to the normal position and a pawl and toothed wheel under the control of the punch-operating mechanism for operating the said retracting-plate, substantially as set forth.

8. The combination with the punch-carrying head and its operating-treadle, of the punches, the locking-bars, the jointed keys for operating the locking-bars, the reciprocating plate for adjusting the keys and a pawl and toothed wheel under the control of the punch-actuating mechanism for reciprocating the said key-adjusting plate, substantially as set forth.

9. The combination with the punch-carrying head, the punches and the means for locking the punches, of a treadle for operating the punch-carrying head and hence the punches, a treadle for returning the punch-carrying head, a feed-carriage, an escapement for controlling the movements of the feed-carriage, a connection between the said escapement and the punch-returning treadle, a pawl and toothed wheel under the control of the punch advancing and returning mechanism, and a sliding block under the control of the said toothed wheel and pawl for arresting the operation of the escapement at intervals.

10. The combination with the movable feed-carriage provided with a rack-bar of an escapement-head, fixed guides on which the escapement-head is mounted, an operating-lever having a loose engagement with the escapement-head for reciprocating it on its guides, a fixed tooth carried by the escapement-head, a spring-actuated movable tooth carried by the escapement-head and means for operating the lever to alternately throw the fixed tooth and movable tooth into and out of engagement with the teeth of the rack-bar on the carriage, substantially as set forth.

WM. COCHRAN.

Witnesses:
LEONARD J. TYNAN,
D. B. VAN BUREN.